United States Patent [19]

Noble

[11] Patent Number: 5,098,249
[45] Date of Patent: Mar. 24, 1992

[54] HIGHWAY TRAILER ENTRY GUIDE

[75] Inventor: William L. Noble, Wolverine Village, Mich.

[73] Assignee: Chrysler Corporation, Highland Park, Mich.

[21] Appl. No.: 586,193

[22] Filed: Sep. 21, 1990

[51] Int. Cl.⁵ .............................................. B65G 69/00
[52] U.S. Cl. .................... 414/401; 414/399; 414/396; 414/402; 414/584
[58] Field of Search .............. 414/608, 400, 401, 402, 414/398, 390, 395, 396, 584, 585, 399, 607; 14/69.5, 71.1; 53/255, 257

[56] References Cited

U.S. PATENT DOCUMENTS

| | | | |
|---|---|---|---|
| Re. 31,060 | 10/1982 | Lutz | 414/400 X |
| 2,691,449 | 10/1954 | Claybourn | 414/401 |
| 3,186,566 | 6/1965 | Spinanger et al. | 414/400 X |
| 3,637,095 | 1/1972 | Kampfer | 414/400 X |
| 4,634,333 | 1/1987 | Butterly, Jr. et al. | 414/400 X |

*Primary Examiner*—Frank E. Werner
*Attorney, Agent, or Firm*—Edward A. Craig

[57] ABSTRACT

A highway trailer entry guide is provided for mounting on the left and right stiles of a building entranceway for cargo to be loaded or unloaded through the rear entranceway of a highway trailer by a fork lift truck. The entry guide includes a slidable and pivotable extension member permitting engagement with the vertical edges of the entranceway of a highway trailer to thereby permit application to various configurations to accomplish the guide function.

4 Claims, 2 Drawing Sheets

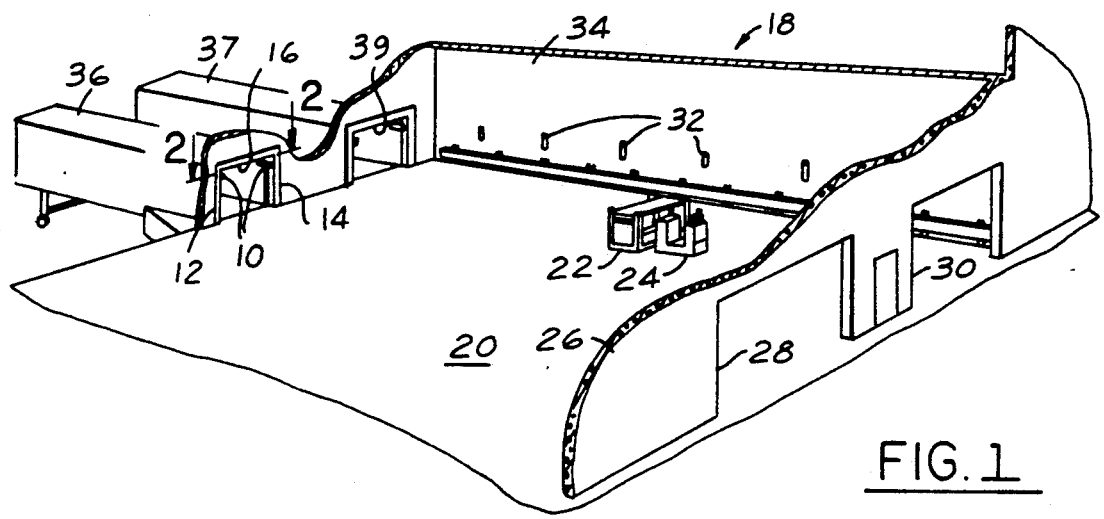
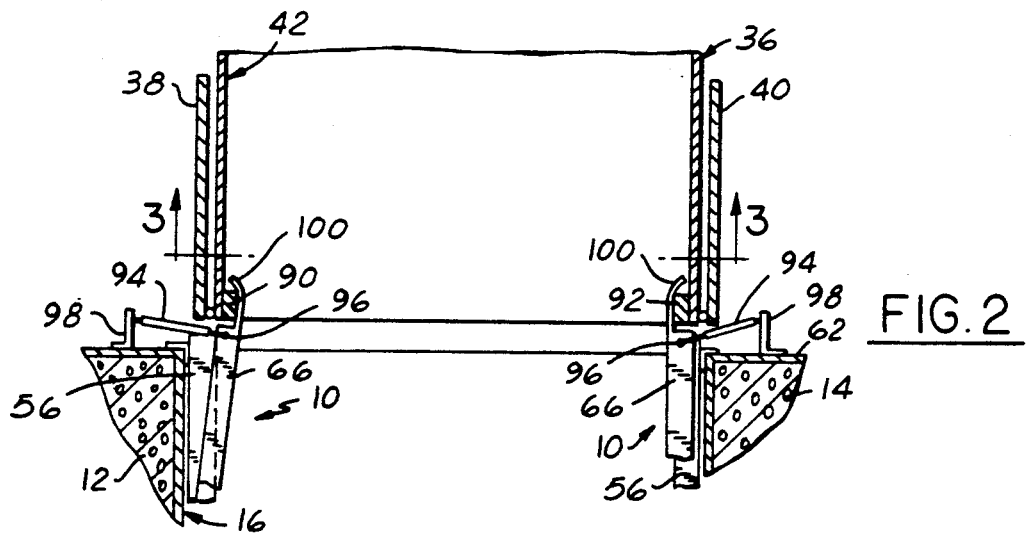
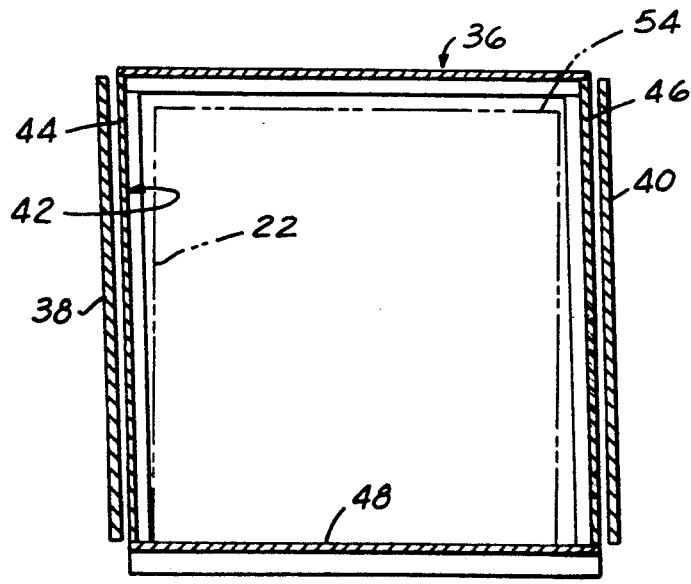

HIGHWAY TRAILER ENTRY GUIDE

BACKGROUND OF THE INVENTION

1. Field of the Invention

This invention relates to a highway trailer entry guide for mounting on the left and right stiles of a building entranceway.

2. Prior Art

As is well-known, it is common practice to back highway trailers up to loading docks and load or unload the trailer through the open rear entranceway thereof. Commonly, this is accomplished by use of fork lift trucks. One problem which has been encountered in connection with such activity is proper alignment of the trailer entranceway with the building entranceway. The highway trailer may not be backed up exactly in proper alignment with the building entranceway. A more serious problem is encountered in connection with highway trailers when such trailers get older. Frequently, the trailer side walls lean to the left or to the right as a consequence of warping or as a result of being impacted by fixed structures during the course of use thereof.

When the side walls of the highway trailer are tilted, the upper portions of the side walls are not in alignment with the lower portions. The highway trailer is normally backed up to a loading dock with the lower portion of the trailer being aligned with the building entranceway. Thus, the upper portions of the trailer side walls may be tilted to the left or to the right with respect to the building entranceway. When it is attempted to load large shipping racks onto the trailer through the building entranceway, the upper portion of the shipping racks may bump into the rear end of the trailer as a result of the lack of alignment of the upper and lower portions of the trailer side walls. Usually, there is sufficient extra loading space in the trailer so that if the fork lift truck is moved into adjusted alignment with the rear entranceway of the trailer, cargo may be loaded or unloaded without interference.

In the past, the fork lift operator has overcome this problem by manipulating the fork lift truck and cargo racks left or right to positions where loading and unloading may be accomplished. However, a modern innovation in this area has resulted in providing automated fork lift trucks to accomplish the loading and unloading functions without the necessity of a human operator. Such a system is described in my co-pending U.S. patent application Ser. No. 375,084, filed July 3, 1989, now U.S. Pat. No. 4,968,209. The fork lift truck is guided in a predetermined path which assumes that the side walls of the highway trailer are in vertical alignment. When such is not the case, there is no means for the electronic guide system to accommodate the variance.

As a consequence, a highway trailer entry guide is provided in accordance with the present invention. This guide will force the fork lift truck, normally by impinging against the cargo rack, to alter its course when the rear of a highway trailer is misaligned, whether such misalignment is caused by parking or by tilted side walls. It is only necessary to shift the path of the fork lift truck a small distance in order to accomplish the desired loading. The entry guide of the present invention will work with a standard fork lift truck. However, a fork lift truck having the ability to permit shifting of the cargo sideways when the cargo is laterally impacted, such as is disclosed in my above-identified application, is preferred.

SUMMARY OF THE INVENTION

A highway trailer entry guide is provided for mounting on the left and right stiles of a building entranceway for cargo to be loaded or unloaded through the rear entranceway of a highway trailer by a fork lift truck. The entry guide is adapted for mounting on a stile in horizontally opposed relation to an entry guide on the opposite stile in the area of the upper portion of the stiles.

The entry guide comprises an elongated support member adapted to be fixedly secured to a stile in a generally horizontal position. An elongated extension is provided. Fastening means are provided for securing the extension at one end thereof to the support member. The fastening means permit the extension to slide to adjusted positions along the length of the support member and permit pivoting of the extension in a generally horizontal plane.

A yieldable element is secured between the extension and the building entranceway. The yieldable element has sufficient elasticity to urge the extension in the direction of the stile upon which the support member is mounted after pivoting of the extension away from the stile. Each entry guide on each stile may be adjusted along its support member and pivoted away from its stile to make contact with the vertical edge of the rear entranceway of a highway trailer to provide a guide for cargo being loaded into the highway trailer through the entranceway by a fork lift truck.

Preferably, the yieldable element is an elastic cord. The unattached end of the extension is desirably curved towards the stile upon which the entry guide is mounted to provided a guide for cargo being unloaded from the highway trailer. In a preferred embodiment, the support member is V-shaped in cross-section with the apex of the V pointing at the stile to which the support member is secured. The fastening means comprise a pair of threaded bolts. The extension has a pair of oppositely disposed threaded openings therein. Each bolt is threadingly received in one of said threaded openings and extends into contact with one exterior side of the support member so that the distance between the outer ends of the bolts is less than the width of the mouth of the V of the support member thereby preventing separation of the support member and extension while permitting the aforementioned sliding and pivoting of the extension with respect to the support member.

BRIEF DESCRIPTION OF THE DRAWINGS

FIG. 1 is a view in perspective of a building having entranceways which permit loading and unloading of cargo trailers by means of a fork lift truck;

FIG. 2 is a sectional view taken substantially along the line 2—2 of FIG. 1 looking in the direction of the arrows;

FIG. 3 is a sectional view taken substantially along the line 3—3 of FIG. 2 looking in the direction of the arrows;

DETAILED DESCRIPTION OF A PREFERRED EMBODIMENT

Figure 4:
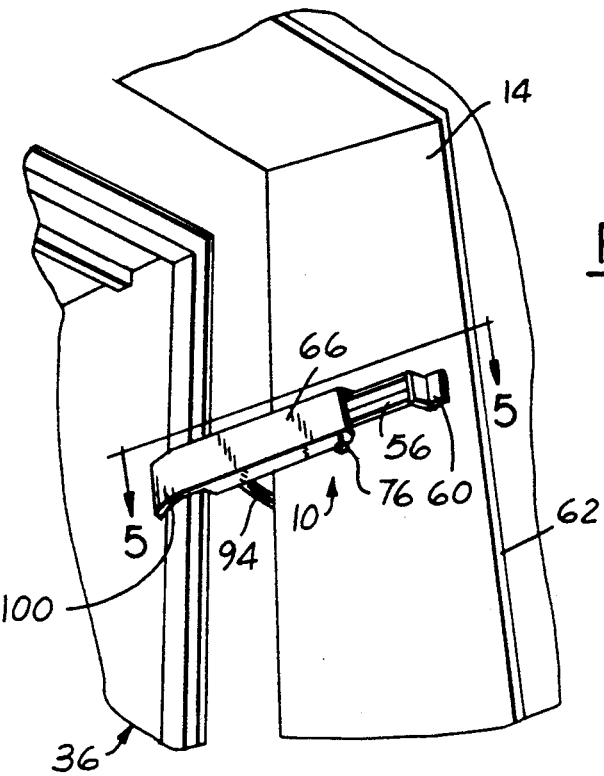
FIG. 4 is a view in perspective of the upper right-hand corner of one of the entranceways of FIG. 1.

Referring to FIGS. 1 and 2, it will be noted that the highway trailer entry guide 10 of the present invention is adapted for mounting on the left and right stiles 12, 14 of the entranceway 16 of a building 18. The building 18 may be, for example, an automotive assembly plant or other industrial or commercial structure. A floor area 20 is provided for temporary storage of cargo, such as racks, containing manufacturing components. One such rack 22 is illustratively being transported by means of a fork lift truck 24. A wall 26 divides the loading area from the main plant. Large wall openings 28, 30 are provided for movement into and out of the loading area. Illustratively, bar code targets 32 are provided on wall 34 for automatically guiding the fork lift truck 24 as described in my aforementioned U.S. patent application Ser. No. 375,084, filed July 3, 1989 (hereby incorporated by reference). The entry guides 10 are effective for conventional loading but are most needed in connection with an automated loading system.

As shown in FIG. 1, a highway trailer 36 has been backed up to the building entranceway 16. Another highway trailer 37 has also been backed up to the other entranceway 39. However, for purposes of description, only the highway trailer 36 and building entranceway 16 will be considered, it being appreciated that the same structure is used in entranceway 39. As shown in FIG. 2, the doors 38, 40 of the highway trailer 36 are opened prior to the trailer being backed up to the entranceway so that the rear entranceway 42 of the highway trailer 36 will be open to permit movement of cargo into or out of the trailer.

One of the most common problems encountered in connection with highway trailers is illustrated in FIG. 3. As will therein be noted, the side walls 44, 46 of the trailer 36 slant to the left. Thus, when the bottom wall or floor 48 of the trailer is properly aligned with the entranceway 16, the upper portions of the side walls will not be properly aligned. This distortion in the side walls of highway trailers frequently occurs after the trailers are several years old. The problem occurs generally because of the rough and tumble nature of trailer usage wherein the trailers bump against stationary objects or are pressured by cargo causing a slight bending or slanting of the side walls. The amount of such slanting is not great, being in the nature of a few inches. However, this is frequently enough to cause interference of the rack 22 (illustrated in dotted lines) when the rack is loaded onto the highway trailer. The rack must be shifted in the illustrated case slightly to the left as shown in order to have the upper corner 54 moved away from the upper portion of the side wall 46. This shifting is accomplished by means of the entry guides 10 of the present invention.

Figure 6:
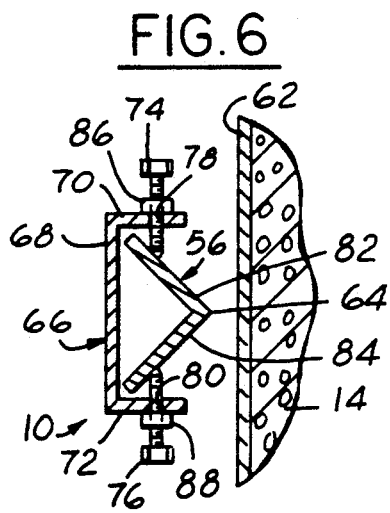
FIG. 6 is a sectional view taken substantially along the line 6—6 of FIG. 5 looking in the direction of the arrows.
Figure 5:
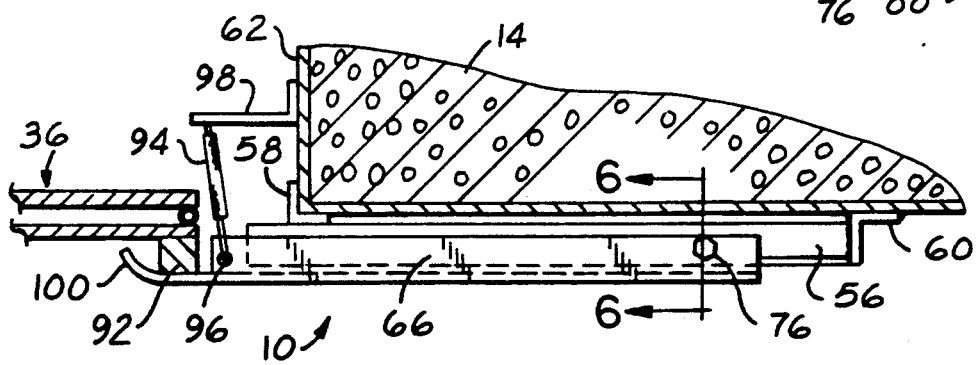
FIG. 5 is a sectional view taken substantially along the line 5—5 of FIG. 4 looking in the direction of the arrows.

Each entry guide 10 is mounted on a stile 12 or 14 in horizontally opposed relation to the entry guide 10 on the opposite stile. The entry guides 10 are mounted in the area of the upper portion of the stiles in view of the fact that this is the area where the slanting of trailer side walls 44, 46 is at a maximum in terms of distance. Each entry guide 10 comprises an elongated support member 56 which is fixedly secured to a stile by means of L-shaped brackets 58, 60. The brackets 58, 60 are illustratively welded to the metal sheath 62 on the entranceway. The sheath is provided to protect the entranceway against damage. As shown in FIG. 6, the support members have a V-shaped cross-section with the apex 64 of the V pointing at the stile upon which the entry guide is mounted, in the illustrated case, the stile 14.

An elongated extension 66 is secured at one end to the support member 56. As will be noted in FIG. 6, the extension 66 is generally U-shaped comprising a web 68 and upstanding side walls 70, 72. The extension 66 is received over the support member 56. Fastening means secure the extension at one end to the support member 56. The fastening means comprise a pair of threaded bolts 74, 76. The extension has a pair of oppositely disposed threaded openings 78, 80 in the side wall 70, 72. Each bolt 74, 76 is threadingly received in one of the threaded openings and extends into contact with an exterior side 82, 84 of the support member 56. Nuts 86, 88 lock the bolts in this position. As will be noted, this results in the distance between the outer ends of the bolts being less than the width of the mouth of the V of the support member thereby preventing separation of the support member 56 and extension 66 while permitting the extension 66 to slide to adjusted positions along the length of the support member 56 and permitting pivoting of the extension 66 in a generally horizontal plane so that the extensions can contact a vertical edge 90, 92 of the rear entranceway 42 of the highway trailer 36 as shown in FIG. 2. Thus, the arrangement provides a guide for cargo being loaded into the highway trailer 36 through the rear entranceway 42 thereof by a fork lift truck.

A yieldable element 94, illustratively an elastic cord, is secured between the extension 66 and the building entranceway 16. Illustratively, the yieldable element 94 is secured between an opening 96 in the extension 66 and a bracket 98 welded to the sheath 62. The yieldable element 94 has sufficient elasticity to urge the extension in the direction of the stile upon which the support member 56 is mounted after pivoting the extension away from the stile to engage the edge of the trailer entranceway. This maintains the entry guide 10 in the desired position. The unattached end 100 of the extension 66 is curved towards the stile upon which the entry guide is mounted to provide a guide around the edges 90, 92 for cargo being unloaded from the highway trailer.

I claim:

1. A highway trailer entry guide for mounting on a left and right stile of a building entranceway for cargo to be loaded or unloaded through a rear entranceway of a highway trailer by a fork lift truck, the entry guide being mounted on a stile in horizontally opposed relation to said entry guide on the opposite stile in an area of an upper portion of the stiles, the entry guide comprising an elongated support member adapted to be fixedly secured to the stile in a generally horizontal position, an elongated extension, fastening means securing the extension at one end thereof to the support member, the fastening means permitting the extension to slide to adjusted positions along a length of the support member and permitting pivoting of the extension in a generally horizontal plane, a yieldable element secured between the extension and the building entranceway, the yieldable element having sufficient elasticity to urge the extension in a direction of the stile upon which the support member is mounted after pivoting of the extension away from said stile, whereby each entry guide on each stile may be adjusted along its support member and pivoted away from its stile to make contact with a vertical edge of the rear entranceway of a highway trailer to provide a guide for cargo being loaded into the highway trailer through the rear entranceway thereof by the forklift truck.

2. A highway trailer entry as defined in claim 1, wherein the yieldable element is an elastic cord.

3. A highway trailer entry guide as defined in claim 1, wherein an unattached end of the extension is curved towards the stile upon which the entry guide is mounted to provide a guide for cargo being unloaded from the highway trailer.

4. A highway trailer entry guide as defined in claim 1, wherein the support member is V-shaped in cross-section with the apex of the V pointing at a stile to which the support member is secured, said fastening means comprising a pair of threaded bolts, the extension having a pair of oppositely disposed threaded openings therein, each bolt being threadingly received in one of said threaded openings and extending into contact with one exterior side of the support member so that the distance between outer ends of the bolts is less than a width of the mouth of the V of the support member thereby preventing separation of the support member and extension while permitting the aforementioned sliding and pivoting of the extension with respect to the support member.

* * * * *